United States Patent
Kahlbacher

[19]

[11] Patent Number: 6,089,604
[45] Date of Patent: Jul. 18, 2000

[54] WHEELED CHASSIS

[76] Inventor: Anton Kahlbacher, Friedenstrasse 50, A-3363 Amstetten-Neufurth, Austria

[21] Appl. No.: 09/124,138

[22] Filed: Jul. 29, 1998

[30] Foreign Application Priority Data

Sep. 15, 1997 [AT] Austria ..................................... 1543/97

[51] Int. Cl.[7] .................................................. B62D 21/00
[52] U.S. Cl. ........................ 280/781; 280/43.23; 180/12; 52/143
[58] Field of Search ..................................... 180/904, 209, 180/15, 12, 13, 252; 280/43, 43.17, 43.23, 781; 244/50; 52/79.5, 143; 135/88.01, 88.02

[56] References Cited

U.S. PATENT DOCUMENTS

| | | | |
|---|---|---|---|
| 1,742,636 | 1/1930 | Collins | 280/43.23 |
| 2,260,369 | 10/1941 | Ebenhack | 52/143 |
| 2,508,057 | 5/1950 | Bishop | 244/50 |
| 2,852,814 | 9/1958 | Bignardi | 52/143 |
| 3,645,406 | 2/1972 | Brazell | 212/14 |
| 3,868,128 | 2/1975 | Mahieu | 180/904 |
| 4,053,025 | 10/1977 | Slusarenko | 180/2 R |
| 4,221,273 | 9/1980 | Finden | 180/6.48 |
| 4,359,117 | 11/1982 | Vaughan | 180/11 |
| 4,813,839 | 3/1989 | Compton | 414/345 |
| 5,158,319 | 10/1992 | Norcia et al. | 280/43.17 |
| 5,222,567 | 6/1993 | Broadhead et al. | 180/15 |
| 5,348,326 | 9/1994 | Fullenkamp et al. | 280/43.17 |
| 5,651,422 | 7/1997 | Casali | 180/13 |

FOREIGN PATENT DOCUMENTS

| | | | |
|---|---|---|---|
| 165686 | 2/1934 | Switzerland | 280/43 |
| 415450 | 1/1934 | United Kingdom | 280/43.17 |
| 603805 | 1/1947 | United Kingdom | 180/213 |

*Primary Examiner*—Anne Marie Boehler
*Assistant Examiner*—Daniel Yeagley
*Attorney, Agent, or Firm*—Brown & Wood, LLP

[57] ABSTRACT

A wheeled chassis including at least one traction bar pivotable about a horizontal axis between a substantially vertical position and a substantially horizontal, towing position, and two spaced from each other axle elements for supporting each pair of freely rotatable wheels, a driving wheel supported on the chassis, and a device for steering the driving wheel about an upright-extending axes, with the wheels supported by one of the two axle elements pivoting about vertical axes, with the pivotal wheels forming apexes of corners of an imaginary rectangular frame and with the driving wheel being located inside of the imaginary rectangular frame adjacent to a longitudinal side of the frame in an offset relationship with respect to a vertical longitudinal central plane of the chassis, while the pivotal freely rotatable wheels located in a trailing relationship with respect to the driving wheel in to a towing direction of the chassis.

11 Claims, 4 Drawing Sheets

WHEELED CHASSIS

BACKGROUND OF THE INVENTION

1. Field of the Invention

The present invention relates to a wheeled chassis including at least one traction bar pivotable about a horizontal axis between a substantially vertical position and a substantially horizontal, towing position, at least two spaced from each other axle elements for supporting each a pair of freely rotatable wheels supported at opposite ends of a respective axle, and a driving wheel supported on the chassis, with the freely rotatable wheels supported by one of the two axle elements pivoting about vertical axes and with the freely rotatable wheels forming apexes of corners of an imaginary rectangular frame.

2. Description of the Prior Art

A wheeled chassis of the type described above is disclosed in British Publication No. 2,193,174. It serves as a carrier for a passenger trap of a type used in airports. In this chassis, the driving wheel is located in the longitudinal central plane of the rectangular chassis, and wheels of one of the axles are connected with the traction bar by a rigid shaft. The driving wheel is supported by a rocker and is adjustable in a vertical plane so that it can be brought into an engagement with the ground and be lifted off the ground. When the chassis is towed by a towing vehicle, the driving wheel is lifted. When the chassis should dock the passenger trap to an aircraft, the driving wheel is lowered so that different necessary maneuvers can be conducted. The driving wheels provides for movement of the chassis under the chassis own power. The speed of the chassis is relatively small and lies in a region of about 8 km/hr.

An object of the present invention is a chassis of the above-described type in which its turning circles are reduced so that it require less space for effecting different maneuvers.

SUMMARY OF THE INVENTION

This and other objects of the present invention, which will become apparent hereinafter, are achieved by providing a steering device for steering the driving wheel and by locating the driving wheel inside of the imaginary rectangular frame adjacent to a longitudinal side of the frame in an offset relationship relative to the longitudinal central plane of the chassis. At that the freely rotatable wheels, which pivot about vertical axes, are located in a trailing relationship with respect to the driving wheel in a towing direction of the chassis.

The chassis can be provided with a covering forming a shelter roof or can carry a passenger trap. Further, the chassis according to the invention can be both equipped with a shelter roof and carry a passenger trap, enabling a protective access to an aircraft by flying public.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
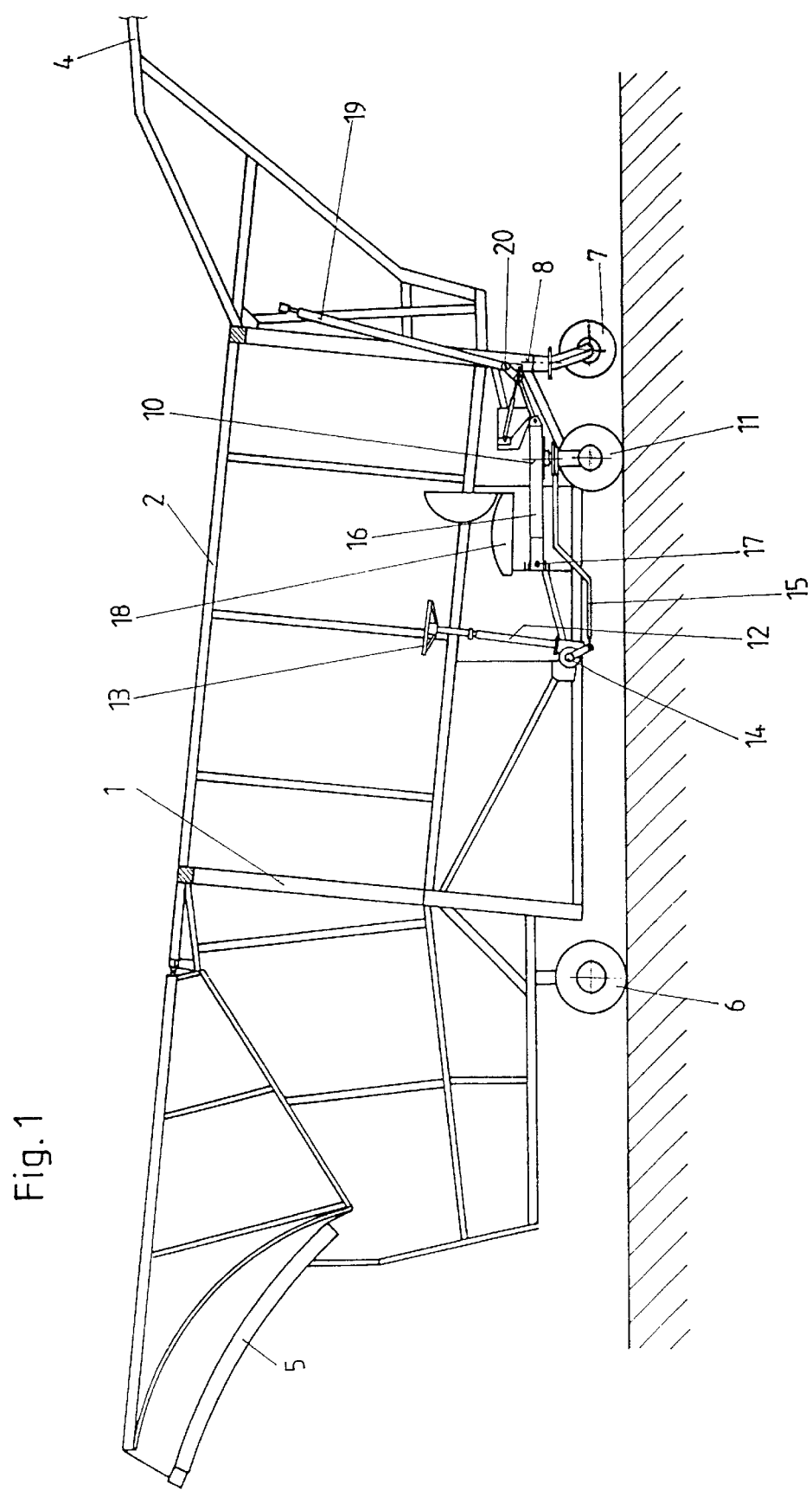
FIG. 1 shows a longitudinal cross-sectional view of a wheeled shelter roof according to the present invention.

A wheeled shelter roof, which is shown in the drawings, is primarily used in airports of local importance. The shelter roof has a portal-like chassis 1 with an upper part 2 and side parts 3. A projecting roof 4 is provided at one end of the chassis 1, and at the chassis other end, there is provided a pivotal bellows frame 5 which adjoins a flying apparatus. The chassis 1, which has a bottom part between the side parts 3, is carried by four freely rotatable wheels 6 and 7 which are supported by respective axles. The axles of the wheels 6 are fixedly secured on the chassis 1, while the wheels 7 are supported with a possibility of a pivotal movement about vertical axes 8 which are arranged sidewise of rotational axes of respective wheels 7. Due to their pivotal movement about the vertical axes 8, the wheels 7 automatically adjust their position in the direction of chassis movement when a tractive or thrust force is applied via a driving wheel 11.

Figure 2:
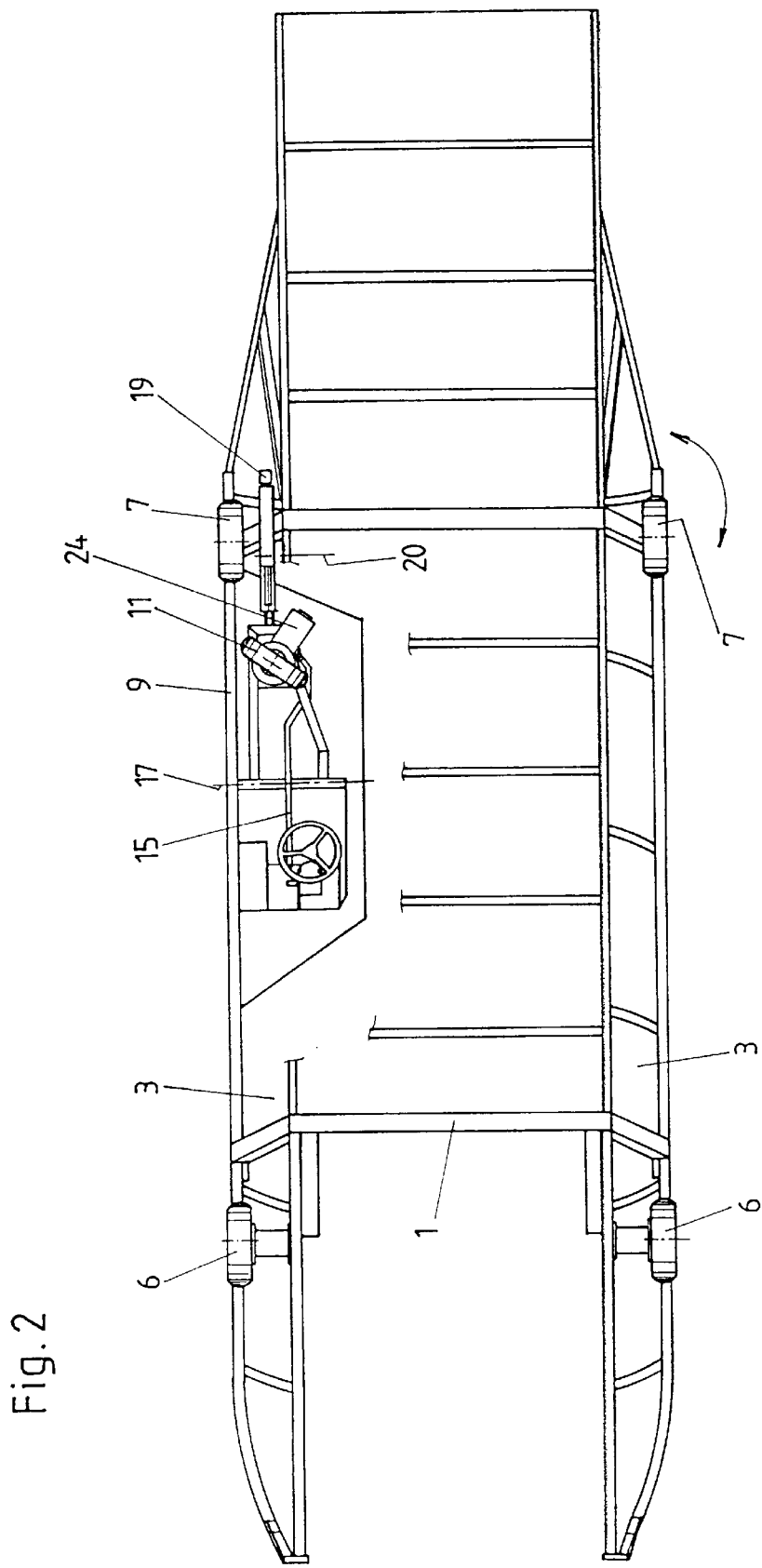
FIG. 2 shows a plan view of the shelter roof shown in FIG. 1, with the roof covering being removed.

The wheels 6 and 7 form apexes of corners of an imaginary rectangle. The driving wheel 11 is provided adjacent to one of the longitudinal sides 9 of this imaginary rectangle and in vicinity of the axle which supports the pivotal wheel 7. According to another embodiment, the driving wheel 11 can be arranged on the extension of the axle supporting the wheel 7. The driving wheel 11 is supported for a pivotal movement about an upright axle 10. The pivotal movement of the driving wheel 11 is controlled by a device which includes a steering column 12 and a steering wheel 13, with the rotational movement of the steering wheel 13 being transmitted to the driving wheel 11 via a transmission mechanism 14 and a connecting rod 15. The driving wheel 11 is supported on a rocker 16 with an axle 17. An operator's seat 18 is located between the driving wheel 11 and the steering column 12. The seat 18 is not shown in FIG. 2 for the sake of clarity. The location of the driving wheel 11 is so selected that it is located in the vicinity of the axle of the pivotable wheel 7. Thereby, a very small turning circle left-and rightward of the wheel 7 can be obtained. The driving wheel 11 is driven by a motor 24 which either flange-mounted on the driving wheel 11 or is supported on the rocker 16.

Figure 3:
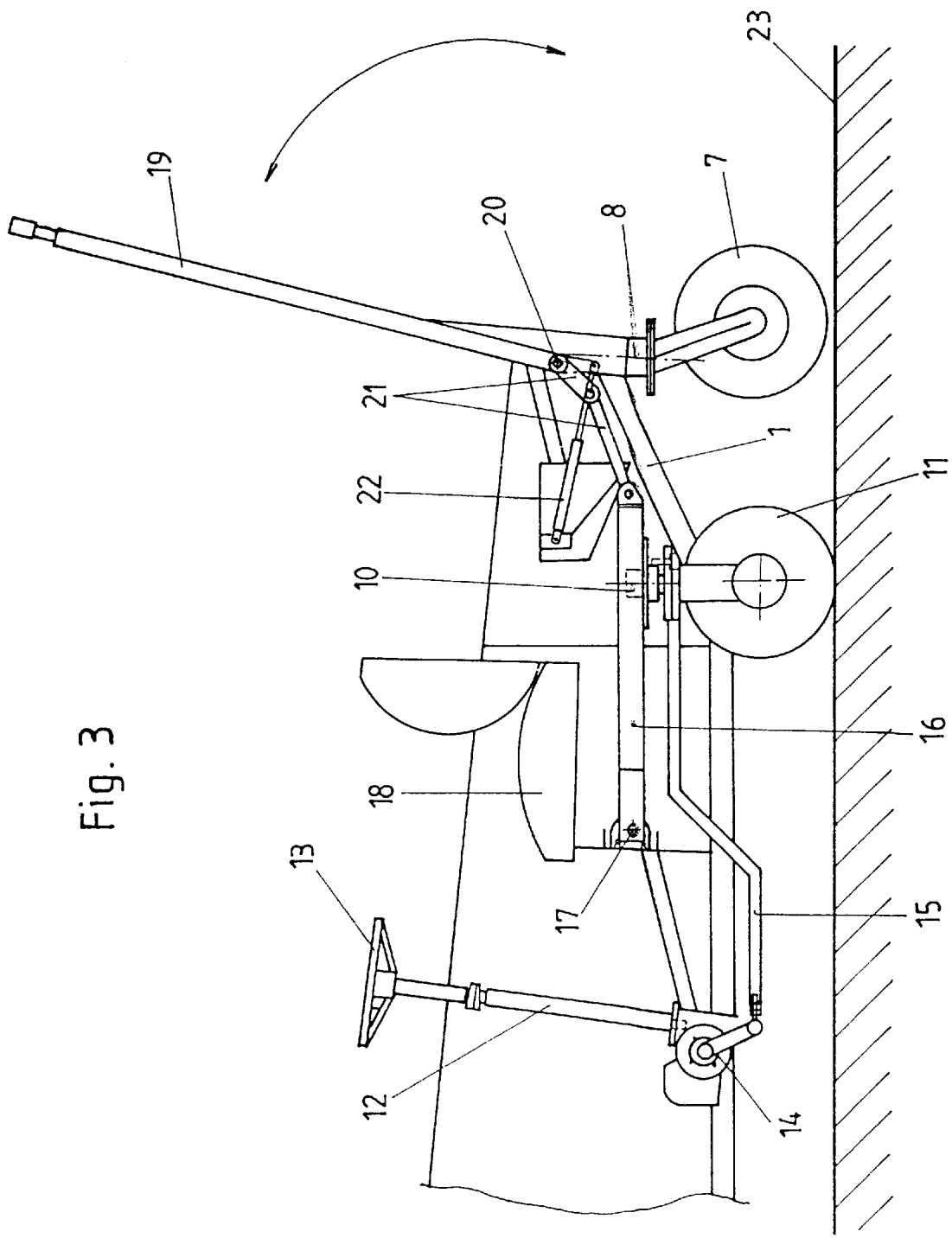
FIG. 3 shows a detail of a chassis of the shelter roof shown in FIG. 1 at an increased scale in a self-powered driving condition.
Figure 4:
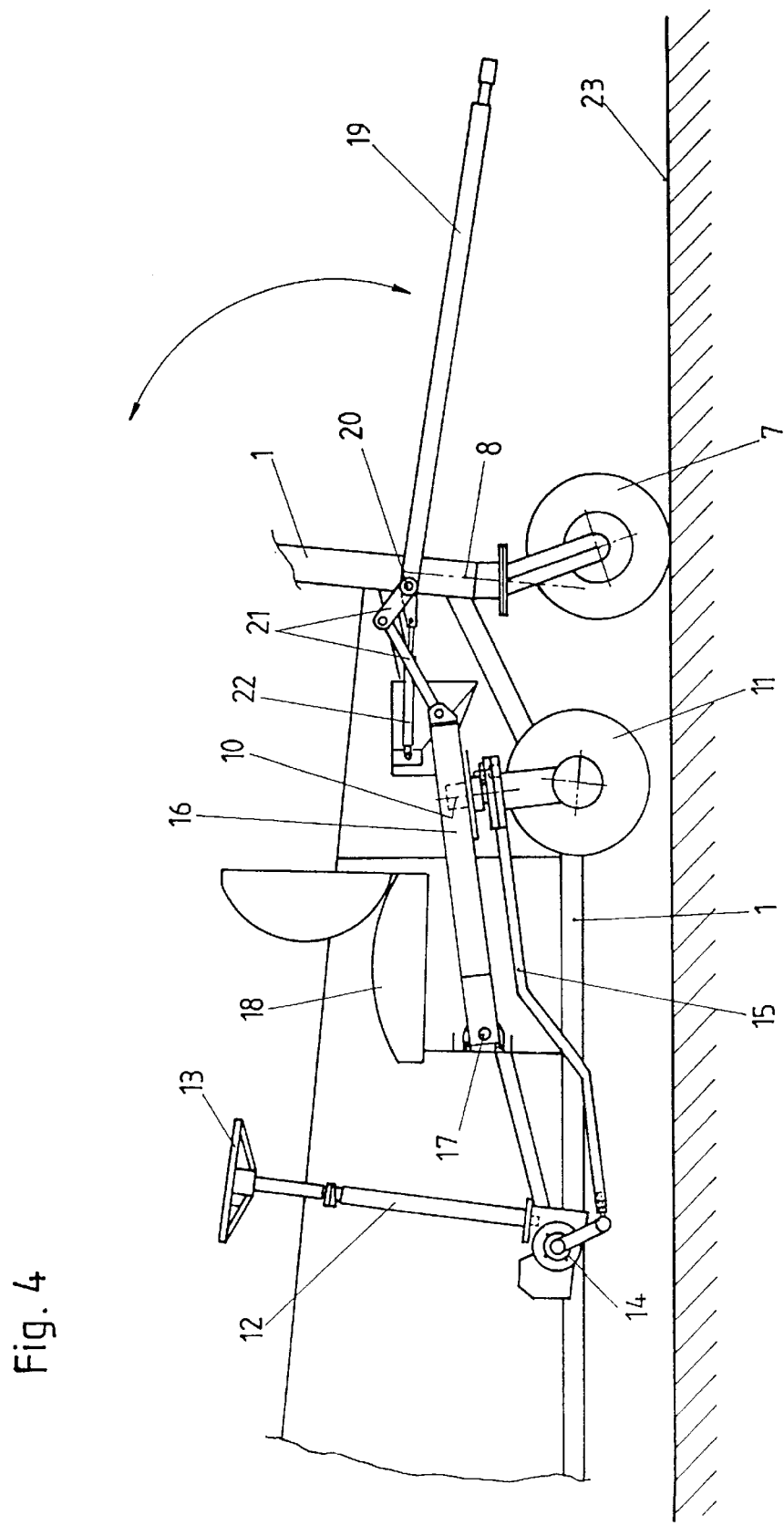
FIG. 4 shows the detail of the chassis shown in FIG. 3 in a towing condition.

Above the axle of the pivotal wheel 7, a traction bar 19 is provided. The traction bar 19 is pivotable from a substantially vertical position shown in FIG. 3 about an axle 20 downward into a horizontal position in which it is located beneath the axle 20, as shown in FIG. 4. A lever mechanism 21, which is connected with the rocker 16, is attached to the end of the taction bar 19 adjacent to the axle 20. A plurality of compression springs 22, only one of which is shown in FIGS. 3–4, extend parallel to the lever mechanism 21. The spring 22 shown in FIGS. 3–4 serves for retaining the traction bar 19 in its substantially vertical position. Other springs 22 serves for pressing the rocker 16, together with the driving wheel 11, downward toward ground 23. At that, it is possible to form separate levers of the lever mechanism 21 as a gas-pressure spring. In the interior of the chassis 1, there is provided a battery for driving the motor 24. Also provided is a control element for turning the motor 24 on and off. Neither the battery nor the control element are shown in the drawings.

The chassis 1 is so formed that it moves either under the action of its own power, which takes place when the chassis 1 is docked to the flying apparatus. However, when the shelter roof has to be moved a relatively long distance, it is moved by a towing vehicle to which it is attached with the traction bar 19.

When the chassis 1 moves under its own power, the traction bar 19 is in its vertical position. The lever mechanism 21, together with the spring 22, press the driving wheel 11, via the rocker 16, toward the ground 23 with such a force that the side part 3 of the chassis, which carries the wheels 7, is slightly lifted, and the wheels 7 become disengaged from the ground, as can be seen in FIG. 3. When the drive motor 24 is actuated, by steering the driving wheel 11 with the steering wheel 13, the chassis 1 is moved with a small speed and can be easily controlled. The shelter roof should be maneuvered carefully and gently. The sidewise arrangement of the operator's seats permits the operator to closely monitor the maneuver.

In case when the shelter roof need be displaced a long distance, the traction bar is pivoted into its horizontal position and is attached to the towing vehicle. When the traction bar 19 is pivoted downward, the lever mechanism 21, together with the spring 22, will pivot the rocker 16 and with it the wheel 11 upward, disengaging the driving wheel 11 from the ground 23. Upon lifting of the driving wheel 11, the chassis 1 can be moved with a relatively high speed by the towing vehicle.

The shelter roof of the type described here has a length of about 10 m. The described construction of the shelter roof insures its high mobility which permits it to negotiate narrow curves without any problem. The operator's seat is so located that the operator can clearly see retractable trap of an aircraft and conduct the docking process very precisely and carefully. Instead of the electrical motor 24, a hydraulic motor can be used for driving the wheel 11. The drive motor can rotate in both clockwise and counter-clockwise direction so that the driving wheel 11 can also be driven in both direction insuring the movement of the chassis 1 forward and backward. The acting forces press the driving wheel 11 against the ground 23, which insures a slideless movement and easy steering possible. The operator's seat 18 is advantageously equipped with a seat contact switch which insures that the drive is only then can be actuated when the operator's seat is occupied. The chassis drive insures movement with a speed from about 0 to 8 km/hr. The speed is controlled steplessly. When the shelter roof is towed, the speed can reach 30 km/hr.

In the embodiment shown in the drawings, the traction bar 19 and the rocker 16 are mechanically connected by the lever mechanism 21 and the spring 22. Instead of a mechanical connection, electrical or hydraulic means, e.g., an electrically or hydraulically controlled shaft with appropriate sensors and control elements can be used. The main thing to insure that the rocker 16 movement depends on the movement of the traction bar 19.

The shelter roof shown in the drawings has a portal-like or tunnel-like chassis which provides free space between the side walls. It is also possible to provide a chassis with a different wall construction which would be able to serve as a passenger trap carrier, as common for airports.

Though the present invention was shown and described in reference to the preferred embodiments, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A wheeled chassis, comprising:

at lease one traction bar pivotable about a horizontal axis between a substantially vertical position and a substantially horizontal towing position;

at least two spaced from each other axle means for supporting each a pair of freely rotatable wheels;

a driving wheel supported on the chassis; and means for steering the driving wheel about an upright-extending axis;

wherein the freely rotatable wheels supported by one of the two axle means pivot about vertical axes;

wherein the freely rotatable wheels form apexes of corners of an imaginary rectangular frame;

wherein the driving wheel is located inside of the imaginary rectangular frame adjacent to a longitudinal side thereof in an offset relationship with respect to a vertical longitudinal central plane of the chassis;

wherein the freely rotatable wheels, which pivot about the vertical axes, are located in a trailing relationship with respect to the driving wheel in a towing direction of the chassis; and wherein the chassis has one of a portal shape and a tunnel shape and is designed as a support for a shelter roof-forming cover.

2. A chassis as set forth in claim 1, wherein the driving wheel is located in vicinity of one of the pivotal freely rotatable wheels.

3. A chassis as set forth in claim 1, wherein the axle means supporting the pivotal freely rotatable wheels is located in vicinity of the traction bar.

4. A chassis as set forth in claim 1, further comprising a rocker for supporting the driving wheel and rotatable about a horizontal axis.

5. A chassis as set forth in claim 4, further comprising a lever mechanism connecting the rocker to a traction bar for pivoting the rocker about the pivotal axis thereof upon pivotal movement of the traction bar from the substantially vertical position to the substantially horizontal position.

6. A chassis as set forth in claim 5, wherein the lever mechanisms comprises a gas-filled spring which connects respective end regions of the rocker and the traction bar.

7. A chassis as set forth in claim 4, further comprising a motor for driving the driving wheel and supported on the rocker.

8. A chassis as set forth in claim 1, wherein the steering means are located adjacent the longitudinal side of the imaginary frame adjacent to which the driving wheel is located.

9. A chassis as set forth in claim 1, wherein the chassis serves as a carrier for a passenger trap.

10. A wheeled chassis, comprising:

at least one traction bar pivotable about a horizontal axis between a substantially vertical position and a substantially horizontal towing position;

at least two spaced from each other axle means for supporting each a pair of freely rotatable wheels;

a driving wheel supported on the chassis; and means for steering the driving wheel about an upright-extending axis;

wherein the freely rotatable wheels supported by one of the two axle means pivot about vertical axes;

wherein the freely rotatable wheels form apexes of corners of an imaginary rectangular frame;

wherein the driving wheel is located inside of the imaginary rectangular frame adjacent to a longitudinal side thereof in an offset relationship with respect to a vertical longitudinal central plane of the chassis;

wherein the freely rotatable wheels, which pivot about the vertical axes, are located in a trailing relationship with respect to the driving wheel in a towing direction of the chassis;

wherein the steering means are located adjacent the longitudinal side of the imaginary frame adjacent to which the driving wheel is located; and wherein the chassis further comprises an operator's seat located between the steering means and the driving wheel.

11. A wheeled chassis, comprising:

at least one traction bar pivotable about a horizontal axis between a substantially vertical position and a substantially horizontal towing position;

at least two spaced from each other axle means for supporting each a pair of freely rotatable wheels;

a driving wheel supported on the chassis; and means for steering the driving wheel about an upright-extending axis;

wherein the freely rotatable wheels supported by one of the two axle means pivot about vertical axes;

wherein the freely rotatable wheels form apexes of corners of an imaginary rectangular frame;

wherein the driving wheel is located inside of the imaginary rectangular frame adjacent to a longitudinal side thereof in an offset relationship with respect to a vertical longitudinal central plane of the chassis;

wherein the freely rotatable wheels, which pivot about the vertical axes, are located in a trailing relationship with respect to the driving wheel in a towing direction of the chassis; and wherein the steering means comprises an upright steering column and a steering wheel attached to the steering column.

* * * * *